(12) United States Patent
Lifantsev

(10) Patent No.: US 8,495,061 B1
(45) Date of Patent: Jul. 23, 2013

(54) AUTOMATIC METADATA IDENTIFICATION

(75) Inventor: Maxim Lifantsev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1689 days.

(21) Appl. No.: 10/952,445

(22) Filed: Sep. 29, 2004

(51) Int. Cl.
*G06F 17/30* (2006.01)

(52) U.S. Cl.
USPC .......... 707/729; 707/713; 707/722; 707/728; 707/736; 707/730; 707/731

(58) Field of Classification Search
USPC 707/3, 101, 102, 4, 2, 200; 382/173; 709/217
See application file for complete search history.

(56) References Cited

U.S. PATENT DOCUMENTS

| | | | |
|---|---|---|---|
| 5,299,026 A * | 3/1994 | Vincett et al. | 358/401 |
| 6,044,375 A * | 3/2000 | Shmueli et al. | 707/101 |
| 6,047,291 A * | 4/2000 | Anderson et al. | 707/103 R |
| 6,055,543 A * | 4/2000 | Christensen et al. | 707/104.1 |
| 6,311,214 B1 * | 10/2001 | Rhoads | 709/217 |
| 6,418,448 B1 * | 7/2002 | Sarkar | 707/104.1 |
| 6,651,059 B1 * | 11/2003 | Sundaresan et al. | 707/6 |
| 6,859,803 B2 * | 2/2005 | Dagtas et al. | 707/5 |
| 2003/0028503 A1 * | 2/2003 | Giuffrida et al. | 707/1 |
| 2003/0208502 A1 * | 11/2003 | Lin | 707/101 |
| 2004/0199547 A1 * | 10/2004 | Winter et al. | 707/200 |
| 2004/0267721 A1 * | 12/2004 | Meyerzon et al. | 707/3 |
| 2005/0041860 A1 * | 2/2005 | Jager | 382/173 |
| 2006/0023945 A1 * | 2/2006 | King et al. | 382/173 |

* cited by examiner

*Primary Examiner* — Syling Yen
(74) *Attorney, Agent, or Firm* — Harrity & Harrity, LLP

(57) ABSTRACT

A system determines whether text of a document includes a document identifier and uses the document identifier to locate metadata in a database when the text of the document includes the document identifier. The system compares the metadata to the text of the document and associates the metadata with the text of the document when at least some of the metadata matches the text of the document.

6 Claims, 8 Drawing Sheets

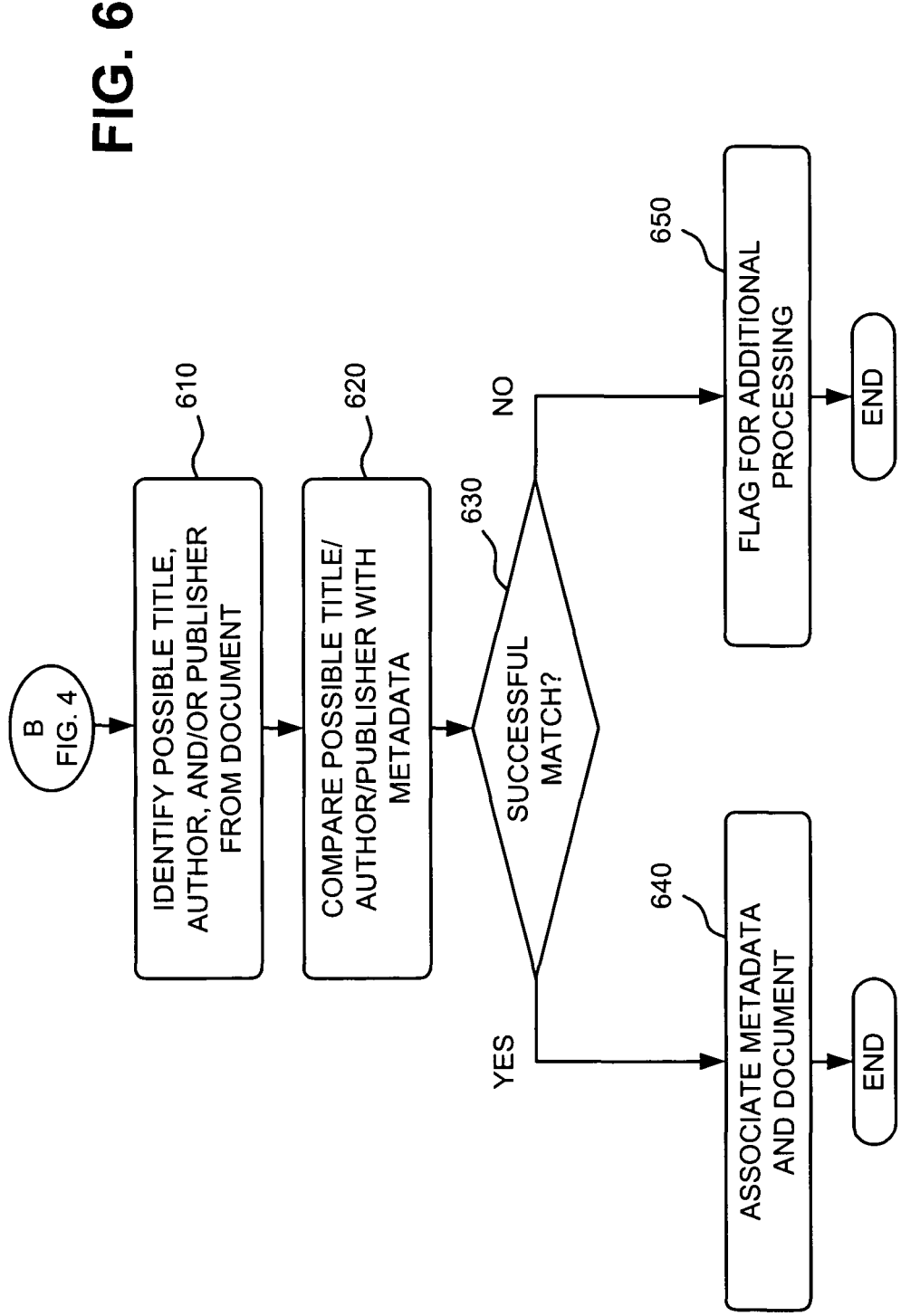

DOCUMENT
COPYRIGHT PAGE

710 — PUBLISHED BY
ABC PUBLISHING COMPANY
123 OAKGLEN DRIVE
NEW YORK, NY 10003

720 — A WALK IN THE PARK
COPYRIGHT © 1997 BY JOHN SMITH

730 — NO PART OF THIS BOOK MAY BE REPRODUCED OR TRANSMITTED IN ANY FORM OR BY ANY MEANS, INCLUDING PHOTOCOPYING, RECORDING, OR OTHER, WITHOUT WRITTEN PERMISSION FROM THE PUBLISHER.

740 — LIBRARY OF CONGRESS CATALOGING-IN-PUBLICATION DATA
SMITH, JOHN
  A WALK IN THE PARK / JOHN SMITH
  INCLUDES BIBLIOGRAPHICAL REFERENCES AND INDEX

750 — ISBN 0123456789

760 — PRINTED IN THE UNITED STATES

FIG. 7

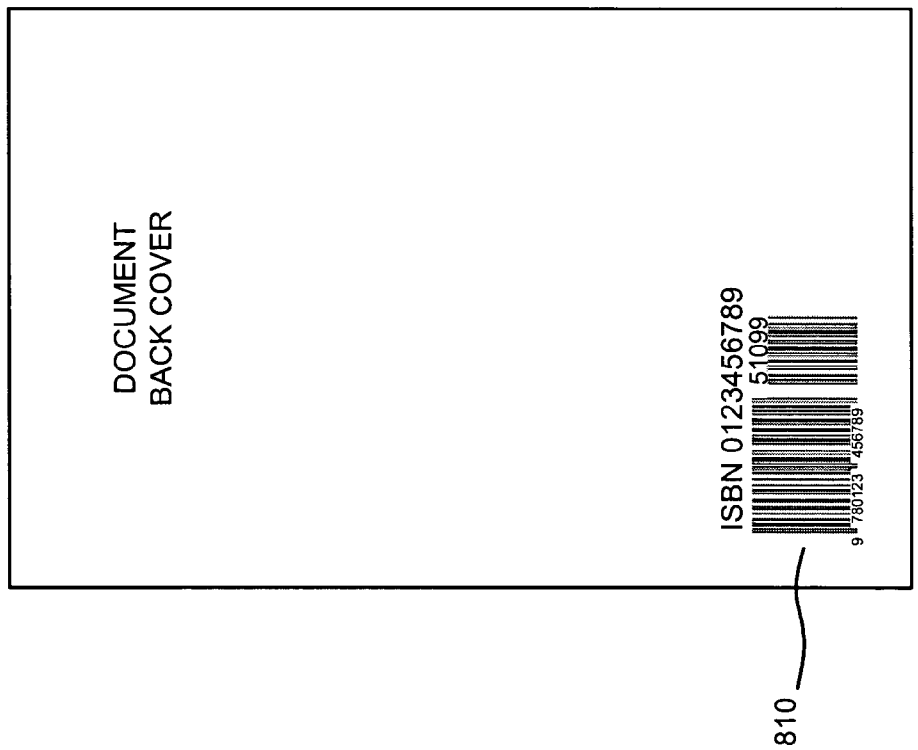

US 8,495,061 B1

AUTOMATIC METADATA IDENTIFICATION

BACKGROUND

1. Field of the Invention

Systems and methods consistent with the principles of the invention relate generally to information retrieval and, more particularly, to the identification of metadata associated with a set of documents.

2. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer readable format (e.g., an ASCII file), is a known technique for converting printed text to a useful digital form. OCR systems generally include an optical scanner for generating images of printed pages and software for analyzing the images.

It is sometimes useful to associate other information, such as categorization, title, author, publisher, and publication date, with the scanned documents. Currently, skilled researchers manually enter this information based on examining the original document.

SUMMARY

According to one aspect, a method may include determining whether text of a document includes a document identifier and using the document identifier to locate metadata in a database when the text of the document includes the document identifier. The method may also include comparing the metadata to the text of the document and associating the metadata with the text of the document when at least some of the metadata matches the text of the document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4-6 are flowcharts of exemplary processing for identifying metadata for and associating the metadata with a document according to an implementation consistent with the principles of the invention;

FIG. 7 is an exemplary diagram of a document copyright page; and

FIG. 8 is an exemplary diagram of a document back cover.

DETAILED DESCRIPTION

The following detailed description of the invention refers to the accompanying drawings. The same reference numbers in different drawings may identify the same or similar elements. Also, the following detailed description does not limit the invention.

Overview

More and more types of documents are becoming searchable via search engines. For example, some documents, such as books, magazines, and/or catalogs, may be scanned and their text recognized via OCR. It is beneficial to understand more about these documents and make this additional information also searchable.

Systems and methods consistent with the principles of the invention may automatically identify metadata associated with a document based on basic metadata (e.g., title, author, publisher, etc.) and create an association between the metadata and the scanned and/or text version of the document, making both the document and its associated metadata searchable. Accordingly, through basic metadata corresponding to a document, various other kinds of additional existing metadata corresponding to the document may be identified and associated with the document.

Exemplary System

Figure 1:
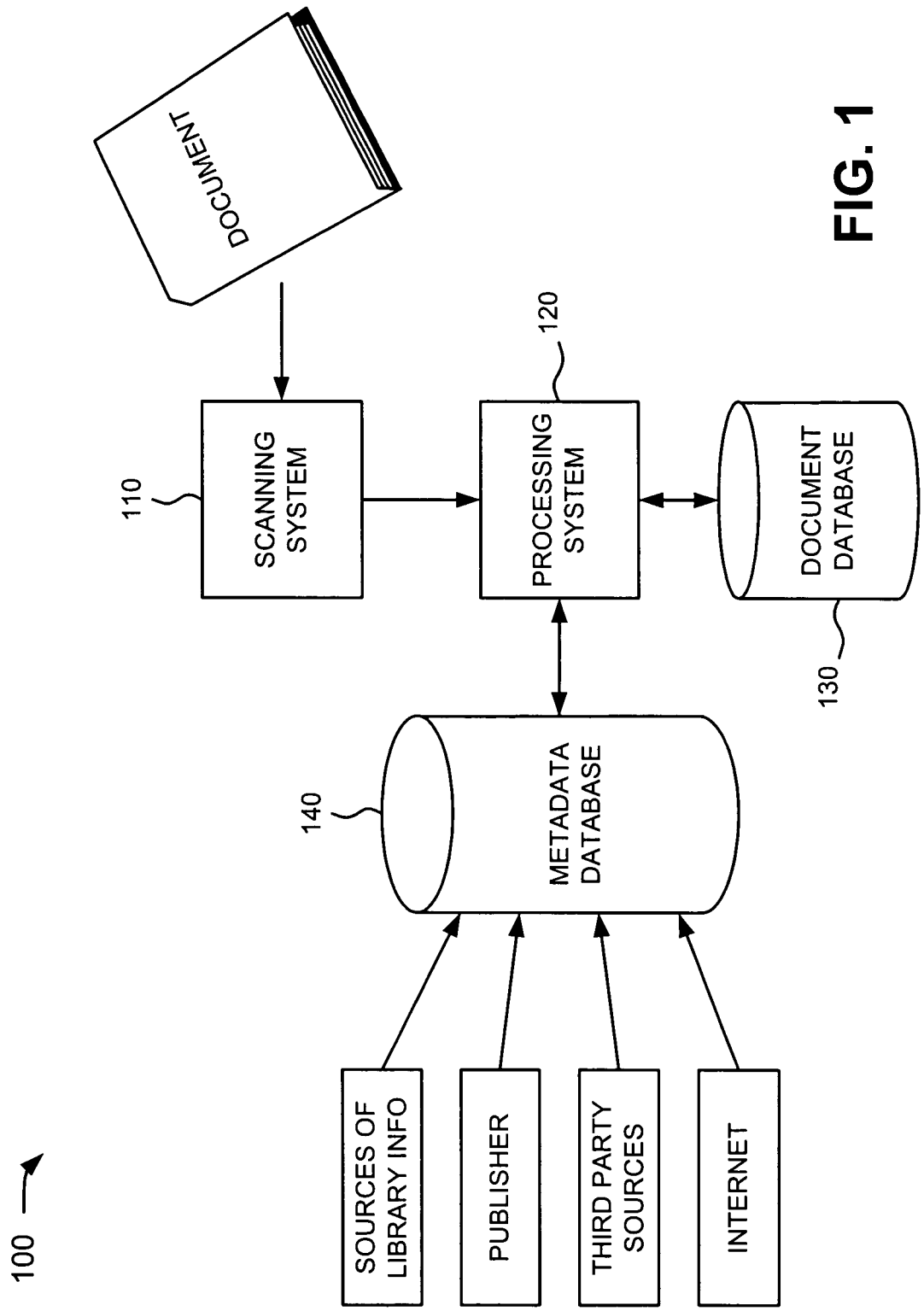
FIG. 1 is a diagram of an exemplary system in which systems and methods consistent with the principles of the invention may be implemented.

FIG. 1 is a diagram of an exemplary system 100 in which systems and methods consistent with the principles of the invention may be implemented. System 100 may include scanning system 110, processing system 120, document database 130, and metadata database 140. Scanning system 110 may scan the pages of a document and perform OCR on the scanned pages to recognize the text associated with the document. Scanning system 110 may use conventional techniques for scanning and performing OCR.

Processing system 120 may store the scanned image and document text in document database 130. As described in more detail below, processing system 120 may identify metadata in metadata database 140 that corresponds to the document and link (or otherwise associate) the metadata and the document image and/or text.

Document database 130 may store the image and text associated with a document. In one implementation, document database 130 may store a link to the metadata in metadata database 140 that corresponds to the document image and text.

Metadata database 140 may store metadata corresponding to documents. Metadata may generally be defined as information obtained separate from the scanning process. The metadata associated with a document may originate from a number of sources, such as sources of library information, a publisher, third party sources, and the Internet. The sources of library information may provide various information regarding a document, such as a title, a list of authors, a list of editors, a publisher, keywords, a number of pages, a subject classification, a publication date, a Library of Congress cataloging number, a digital object identifier (DOI), an International Standard Book Number (ISBN), and/or an International Standard Serial Number (ISSN). Examples of sources of library information may include libraries and organizations, such as the Online Computer Library Center (OCLC) and the Research Libraries Group (RLG). A publisher may also provide information regarding a document, such as the full text of the back cover, the flaps, and/or the table of contents of the document, sales statistics, and/or readership statistics.

Third party sources may provide information regarding a document, such as a first chapter excerpt or other information regarding a document, possibly including information identified above as being provided by the sources of library information or the publisher. Examples of third party sources include Ingram Book Company, Baker and Taylor, and Dial-A-Book (a company that sells excerpts of first chapters of documents). The Internet may be another source of information regarding a document. Information gathered from the Internet regarding a document may include information regarding web documents relating to the document or the author of the document.

Metadata database 140 may store a document's metadata in a record. In one implementation, the records of metadata database 140 are arranged to form a relational database. A key in a relational database is a field or a combination of fields that uniquely identify a record or reference another record. In one implementation, a document identifier, such as an ISBN, ISSN, and/or DOI, may be used as a key to uniquely identify a record within metadata database 140.

Figure 2:
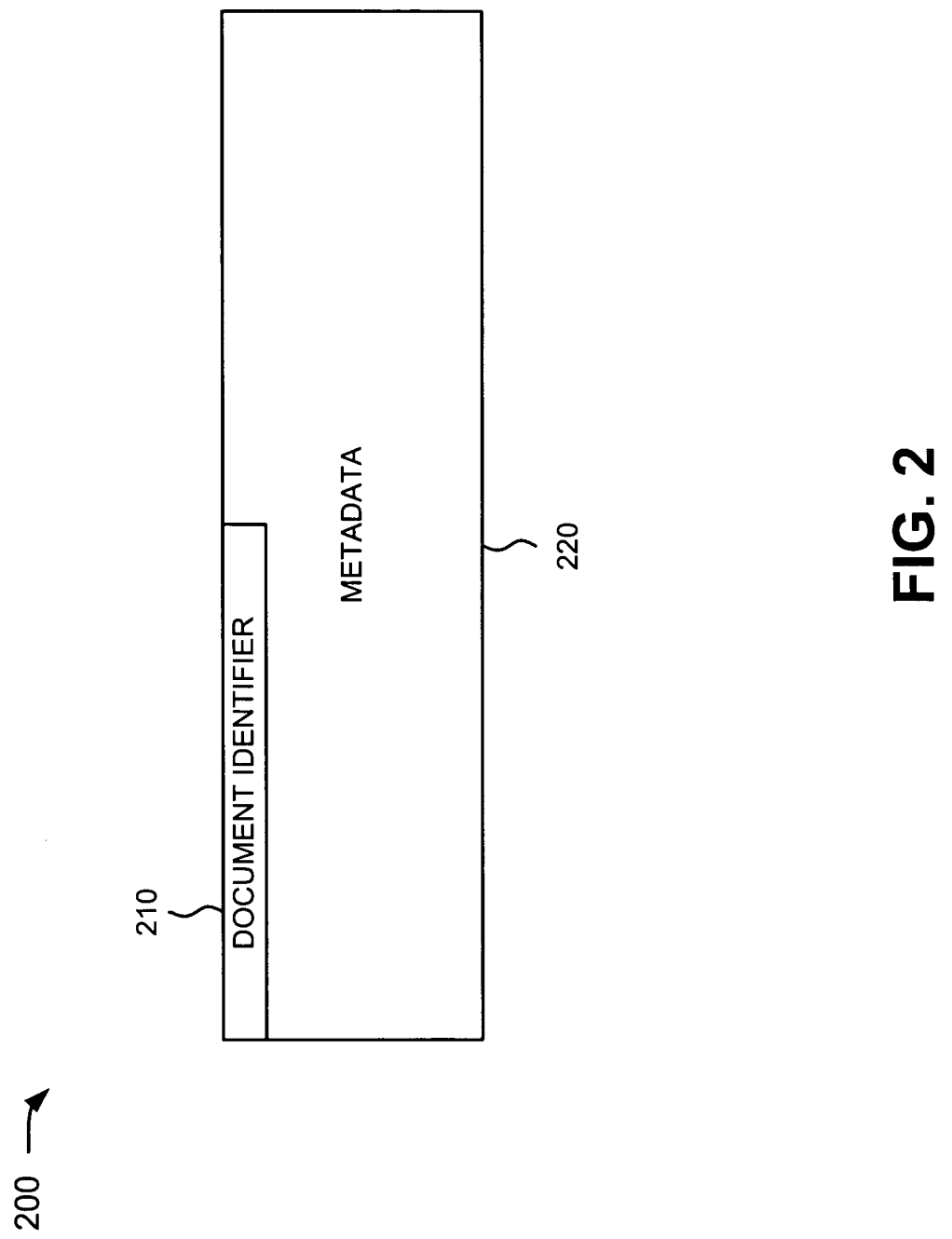
FIG. 2 is an exemplary diagram of a record within the metadata database of FIG. 1 according to an implementation consistent with the principles of the invention.

FIG. 2 is an exemplary diagram of a record 200 within metadata database 140 according to an implementation consistent with the principles of the invention. Record 200 may include a number of fields, such as a document identifier field 210 and metadata field(s) 220. Document identifier field 210 may store a document identifier that may (alone or in combination with other types of data) uniquely identify a document. Examples of document identifiers may include ISBNs, ISSNs, and DOIs.

Metadata field(s) 220 may store information, such as the information provided by the various sources described above. In some instances, the information in metadata field(s) 220 may correspond to a single document. In other instances, the information in metadata field(s) 220 may correspond to multiple documents (e.g., documents corresponding to conference proceedings or a series of conference proceedings). In these latter instances, other information, such as a volume number or issue number, may be used to identify metadata associated with a particular document within record 200.

In an alternate implementation, the document image and/or text may be stored in another location within metadata database 140 and linked to its associated metadata within metadata database 140. In yet another implementation, the actual document image and/or text may be stored in the same record as its associated metadata. In either of these implementations, document database 130 may be unnecessary.

Exemplary Processing System/Scanning System Architecture

Figure 3:
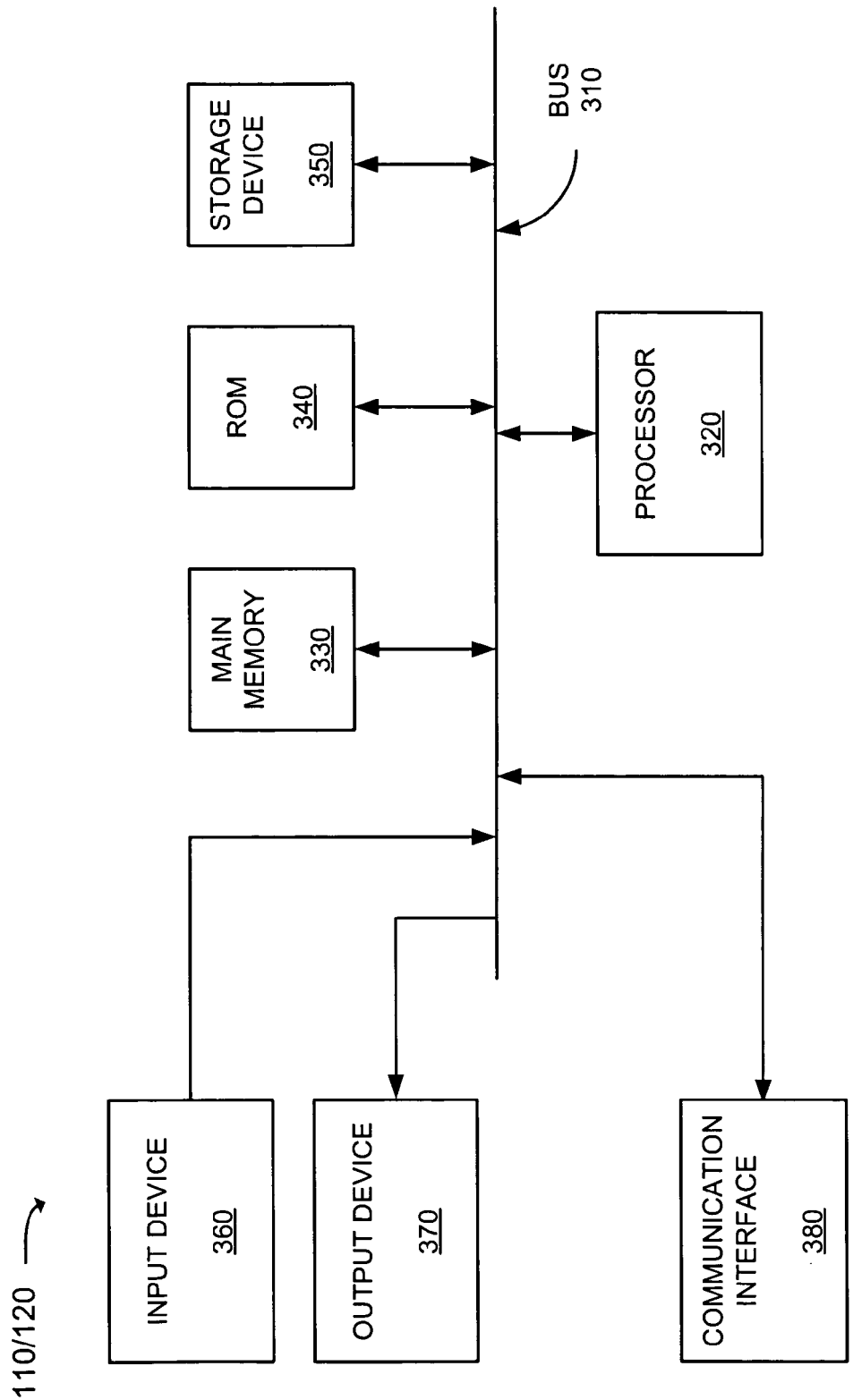
FIG. 3 is an exemplary diagram of the processing system and/or scanning system of FIG. 1 according to an implementation consistent with the principles of the invention.

FIG. 3 is an exemplary diagram of processing system 120 and/or scanning system 110 ("system 110/120") according to an implementation consistent with the principles of the invention. In this implementation, system 110/120 may take the form of a computer. In another implementation, system 110/120 may include a set of cooperating computers.

As shown in FIG. 3, system 110/120 may include a bus 310, a processor 320, a main memory 330, a read only memory (ROM) 340, a storage device 350, an input device 360, an output device 370, and a communication interface 380. Bus 310 may include a path that permits communication among the elements of system 110/120.

Processor 320 may include a conventional processor, microprocessor, or processing logic that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits an operator to input information to system 110/120, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables system 110/120 to communicate with other devices and/or systems.

Exemplary Processing

Figure 4:
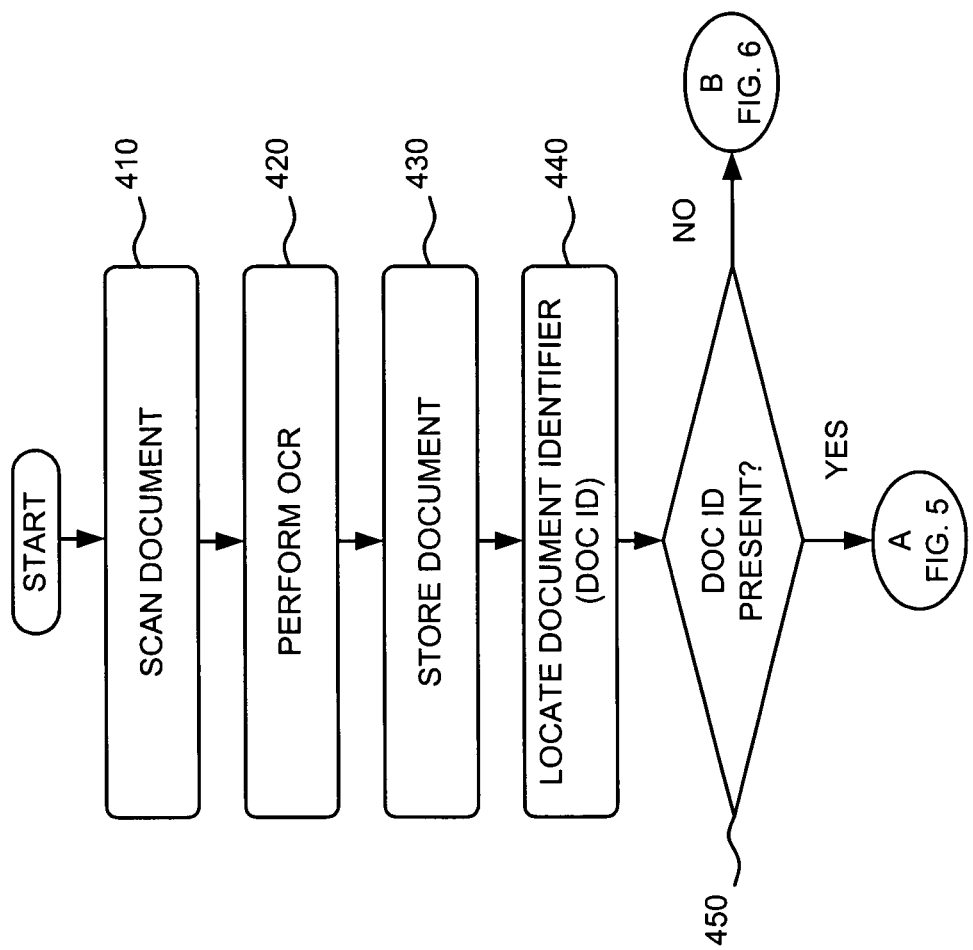
Figure 5:
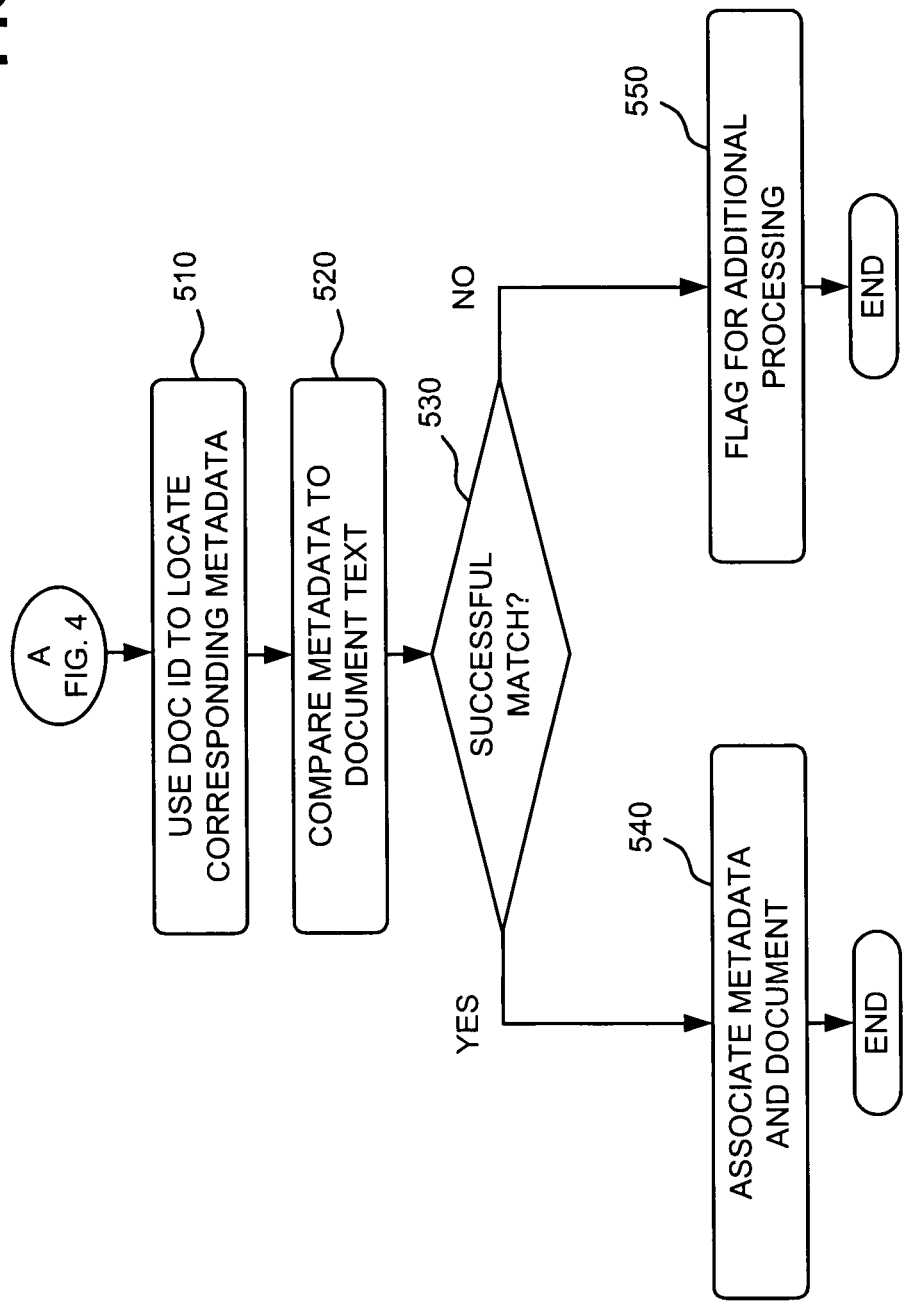

FIGS. 4-6 are flowcharts of exemplary processing for identifying metadata for and associating the metadata with a document according to an implementation consistent with the principles of the invention. Processing may begin with the scanning of a document (act 410) (FIG. 4). Conventional scanning techniques may be used to capture images of the pages of the document. OCR may then be performed on the images of the pages of the document (act 420). Conventional OCR techniques may be used to recognize the text in the document, characteristics of the text (e.g., font, size, etc.), and where the text lies on the pages based on the images of the pages of the document. The document images and/or text may then be stored either in document database 130 or metadata database 140 (act 430).

A document identifier (e.g., an ISBN, ISSN, and/or DOI) associated with the document may be located within the document text (act 440). The document identifier may be located at a couple of different places within the document and the particular places may differ based on the type of document. For example, the document identifier may be located on a copyright page of the document. FIG. 7 is an exemplary diagram of a document copyright page. The copyright page typically includes information regarding the publisher of the document 710, the title, copyright date, and author of the document 720, a statement of rights regarding the document 730, a Library of Congress statement 740, an ISBN or ISSN 750, and a location of printing 760. Other copyright pages might include more, fewer, or different pieces of information.

To identify the copyright page of a document, the first several pages of the document may be analyzed. In one implementation, the first several pages of the document may be searched for the presence of a certain keyword, or keywords, that is indicative of the copyright page, such as "Library of Congress," "ISBN," or "ISSN." Alternatively or additionally, the pages may be searched for other information that is indicative of the copyright page, such as the copyright symbol (©), typical phrases of copyright statements, a "printed in" clause, or the presence of a date.

Once the copyright page has been identified (with some degree of certainty), the document identifier may be identified. An ISBN includes ten digits and is usually located shortly after the text "ISBN," or its unabbreviated version. An ISSN includes eight digits and is usually located shortly after the text "ISSN," or its unabbreviated version. Both ISBN and ISSN have built-in check digits that permit a significant percentage of other numbers of correct length to be easily discarded from consideration. Sometimes, the copyright page includes more than one instance of the same document identifier (e.g., ISBN or ISSN). This may assist in getting the correct document identifier in light of possible OCR errors.

Alternatively or additionally, the document identifier may be located within a barcode associated with the document, such as on the back cover or inside the front or back cover of the document. FIG. 8 is an exemplary diagram of a document back cover. The document back cover may include, among other things, a barcode 810. Barcode 810 may encode certain pieces of information, including an ISBN or ISSN. As shown in FIG. 8, barcode 810 encodes the digits 978012345678951099. The "978" may indicate that this barcode is a bookland barcode; the "0123456789" corresponds to the ISBN; the "5" may represent a country code corresponding to the United States; and the "1099" may refer to the retail price of $10.99 for the document. In other implementations, barcode 810 may encode more, fewer, or different pieces of information.

In one implementation, the document identifier may be identified from both the copyright page and the barcode of the document. The document identifiers may then be compared to determine whether they match. A match may indicate that the correct document identifier has been located. When they do not match, the document identifier from the barcode may be used over the document identifier from the copyright page because it is not uncommon for a copyright page to include more than one document identifier for different editions, bindings, or versions of the document.

If the document identifier has been successfully located (act 450), then the document identifier may be used to locate a corresponding record in metadata database 140 (act 510) (FIG. 5). For example, metadata database 140 may be searched to identify a record that includes the document identifier as a key. In some instances, additional information, such as a volume number or issue number (either obtained automatically or manually), may be used to identify the metadata associated with a document within the identified record. In another implementation, the metadata association may be more complex than linking one existing record in metadata database 140 with a document. For example, based on document identifiers (e.g., ISSN, ISBN, and series number) parsed from the document, several metadata records from metadata database 140 may be identified and merged into a more complete record for this specific document that did not explicitly exist before in metadata database 140 and which may be different from simply the union of the records from which it is created.

In one implementation, basic metadata from the record may be compared to the text of the document to make sure that the correct metadata has been identified (act 520). For example, the title of the document with which the metadata is associated, the name of the author associated with this document, and/or the name of the publisher associated with this document, as retrieved from metadata database 140, may be respectively compared to the possible title, name of the author, and/or name of the publisher within the document text to determine whether there is a match.

The title, name of the author, and name of the publisher within the document text has been labeled as "possible" because this information may be determined to a degree of certainty, though sometimes less than absolute certainty due to possible OCR errors, extraction errors, and formatting differences. As mentioned above, the scanning process may determine the text in the document, characteristics of the text (e.g., font, size, etc.), and where the text lies on the page. Based on this information and information about the typical layout of a document, information, such as the title of the document, the name of the author, and the name of the publisher, can be determined.

While the title of the document, the name of the author, and/or the name of the publisher may be used to match with metadata in metadata database 140, more, fewer, or different pieces of information may be used in other implementations consistent with the principles of the invention. For a match to be successful, it may be required that all of the pieces of information match or that some percentage of them match.

If the match is successful (act 530), then the metadata may be associated with the document image and/or text (act 540). In one implementation, the association may include storing a link to the metadata in document database 130. In another implementation, the association may include storing the document image and/or text in the record that contains the metadata (or elsewhere) in metadata database 140.

If a comparison of the metadata and the document text results in an unsuccessful match (act 530), then the document may be flagged for additional processing (act 550). In one implementation, the additional processing might entail manual identification of the document identifier or manual identification of the metadata in metadata database 140 that corresponds to the document.

If the document identifier has not been successfully located (act 450) (FIG. 4), such as in the case where the document does not include a document identifier, then the possible title of the document, name of the author, and/or name of the publisher may be identified within the document text (act 610) (FIG. 6). As mentioned above, the scanning process may determine the text in the document, characteristics of the text (e.g., font, size, etc.), and where the text lies on the page. Based on this information and information about the typical layout of a document, information, such as the title of the document, the name of the author, and the name of the publisher, can be determined with some degree of certainty.

The possible title of the document, name of the author, and/or name of the publisher may be compared to author names, publisher names, and/or titles within the metadata in metadata database 140 (act 620). For a match to be successful, it may be required that all of the pieces of information match or that some percentage of them match.

If the match is successful (act 630), then the metadata may be associated with the document image and/or text (act 640). As mentioned above, the association may include storing a link to the metadata in document database 130. In another implementation, the association may include storing the document image and/or text in the record with the metadata (or elsewhere) in metadata database 140.

If a comparison of the metadata and the document text results in an unsuccessful match (act 630), then the document may be flagged for additional processing (act 650). In one implementation, the additional processing might entail manual identification of the document identifier or manual identification of the metadata in metadata database 140 that corresponds to the document.

Once a document's metadata has been associated with its image and/or text, all of this information may be available to users for keyword searching and result presentation and to further processing that can now benefit from the availability of structured metadata for the document.

CONCLUSION

Systems and methods consistent with the principles of the invention may automatically identify metadata associated with a document and create an association between the metadata and the image and/or text version of the document, making both the document content and its associated metadata available for searching or other processing.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a system, the method comprising:
    analyzing, using a processor of the system, pages of a document to identify a page that includes a document identifier,
        wherein the document identifier comprises an International Standard Book Number (ISBN), an International Standard Serial Number (ISSN), or a Digital Object Identifier (DOI), and
        wherein analyzing the pages of the document comprises:
            identifying a copyright page within the document,
            reading a barcode at a particular location within the document,
            locating the ISBN, ISSN, or DOI on the copyright page and within the barcode,
            determining whether the ISBN, ISSN, or DOI on the copyright page matches the ISBN, ISSN, or DOI within the barcode,
            using the ISBN, ISSN, or DOI as the document identifier when the ISBN, ISSN, or DOI on the copyright page matches the ISBN, ISSN, or DOI within the barcode, and
            using the ISBN, ISSN, or DOI within the barcode as the document identifier when the ISBN, ISSN, or DOI on the copyright page does not match the ISBN, ISSN, or DOI within the barcode;
    identifying, using the processor, the document identifier located at the identified page of the document;
    locating, using the processor and the document identifier, metadata in a database;
    comparing, using the processor, the metadata to text of the document; and
    associating, using the processor, the metadata with the text of the document when at least some of the metadata matches the text of the document.

2. A method performed by a system, the method comprising:
    analyzing, using a processor of the system, pages of a document to identify a page that includes a document identifier,
        wherein the document identifier comprises an International Standard Book Number (ISBN), an International Standard Serial Number (ISSN), or a Digital Object Identifier (DOI);
    identifying, using the processor, the document identifier located at the identified page of the document;
    locating, using the processor and the document identifier, metadata in a database;
    comparing, using the processor, the metadata to text of the document;
    indicating that manual processing is needed when the metadata does not match the text of the document; and
    associating, using the processor, the metadata with the text of the document when at least some of the metadata matches the text of the document.

3. A method performed by a system, the method comprising:
    analyzing, using a processor of the system, pages of a document to identify a page that includes a document identifier,
        wherein the document identifier comprises an International Standard Book Number (ISBN), an International Standard Serial Number (ISSN), or a Digital Object Identifier (DOI);
    identifying, using the processor, the document identifier located at the identified page of the document;
    locating, using the processor and the document identifier, metadata in a database;
    comparing, using the processor, the metadata to text of the document;
    associating, using the processor, the metadata with the text of the document when at least some of the metadata matches the text of the document;
    identifying at least one of a title, author information, or publisher information within the text of the document when the pages of the document do not include the document identifier;
    comparing the at least one of a title, author information, or publisher information to a respective one of titles, author information, or publisher information in the database; and
    associating other metadata with the text of the document when the at least one of a title, author information, or publisher information matches a respective one of a title, author information, or publisher information associated with the other metadata.

4. The method of claim 3, further comprising:
    indicating that manual processing is needed when the at least one of a title, author information, or publisher information does not match a respective one of a title, author information, or publisher information in the database.

5. A system, comprising:
    a memory to store metadata as records; and
    a processor to:
        locate a first document identifier on a copyright page of a document,
        locate a second document identifier within a barcode of the document, determine whether the first document identifier on the copyright page matches the second document identifier within the barcode, identify one of the records in the memory based on one of the first document identifier or the second document identifier when the first document identifier matches the second document identifier, determine whether the metadata in the identified record matches text of the document, and associate the metadata in the identified record with the text of the document when at least some of the metadata in the identified record matches the text of the document.

6. The system of claim 5, wherein the metadata in the memory originates from at least one of a source of library information, a publisher, the Internet, or a third party source that aggregates information.

\* \* \* \* \*